US 12,086,285 B1

(12) United States Patent
Guenther et al.

(10) Patent No.: US 12,086,285 B1
(45) Date of Patent: Sep. 10, 2024

(54) DATA SUBJECT REQUEST TIERING (71) Applicant: Wells Fargo Bank, N.A., San Francisco, CA (US)

(72) Inventors: Damien Guenther, Newport, RI (US); Chris McClennen, Charlotte, NC (US); Joy Middleton-Saulny, Smyrna, GA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 715 days.

(21) Appl. No.: 16/915,908

(22) Filed: Jun. 29, 2020

(51) Int. Cl.
    G06F 21/62 (2013.01)
    G06F 21/31 (2013.01)
    H04L 9/40 (2022.01)

(52) U.S. Cl.
    CPC .......... *G06F 21/6254* (2013.01); *G06F 21/31* (2013.01); *H04L 63/105* (2013.01); *H04L 63/108* (2013.01); *H04L 63/20* (2013.01)

(58) Field of Classification Search
    CPC ... G06F 21/6254; G06F 21/31; H04L 63/105; H04L 63/108; H04L 63/20
    See application file for complete search history.

(56) References Cited

U.S. PATENT DOCUMENTS

| | | |
|---|---|---|
| 7,162,451 B2 | 1/2007 | Berger et al. |
| 7,234,065 B2 | 6/2007 | Breslin et al. |
| 7,496,191 B1 | 2/2009 | Crews et al. |
| 7,739,227 B2 | 6/2010 | Jordan et al. |
| 7,865,735 B2 | 1/2011 | Machos |
| 7,890,530 B2 | 2/2011 | Bilger et al. |
| 7,913,291 B2 | 3/2011 | Yeung et al. |
| 8,607,308 B1 | 12/2013 | Langford et al. |
| 8,869,301 B2 | 10/2014 | Reeves et al. |
| 9,083,689 B2 | 7/2015 | Lindemann et al. |
| 9,195,820 B2 | 11/2015 | O'Neill et al. |
| 9,203,843 B2 | 12/2015 | Arasavelli et al. |

(Continued)

FOREIGN PATENT DOCUMENTS

| | | |
|---|---|---|
| WO | 2017187207 A1 | 11/2017 |
| WO | 2019236815 A1 | 12/2019 |

OTHER PUBLICATIONS

Sheikhalishahi et al., "Privacy-Preserving Multi-Party Access Control," 18th Workshop on Privacy in the Electronic Society (WPES '19), Nov. 11, 2019, London, United Kingdom. ACM, New York, NY, USA, 13 pages.

(Continued)

*Primary Examiner* — Wasika Nipa
*Assistant Examiner* — Andrew Suh
(74) *Attorney, Agent, or Firm* — Merchant & Gould P.C.

(57) ABSTRACT

A method of providing a data disclosure to a requester can include: receiving a data subject request from a requester, the data subject request including a request for stored personal data; categorizing the element data into one of a plurality of tiers based on a sensitivity level of the element data; assigning an assigned tier to the element data and associated data values; determining a level of detail of the associated data values for each of the element data to provide based on the assigned tier; and providing a data disclosure report to the requester, wherein the data disclosure report includes the level of detail of data values for each of the element data based on the assigned tier.

7 Claims, 6 Drawing Sheets (56) References Cited

U.S. PATENT DOCUMENTS

| | | | |
|---|---|---|---|
| 9,536,107 B2 | 1/2017 | Soman et al. | |
| 10,038,726 B2* | 7/2018 | Gaddam | H04L 63/105 |
| 2014/0164439 A1 | 6/2014 | Gale | |
| 2016/0044039 A1 | 2/2016 | Montanari et al. | |
| 2016/0050210 A1* | 2/2016 | Nguyen | H04L 63/0407 |
| | | | 726/4 |
| 2018/0108434 A1 | 4/2018 | Freedman | |
| 2018/0124062 A1* | 5/2018 | Scott | H04L 63/105 |
| 2018/0285591 A1* | 10/2018 | Thayer | G06F 21/6254 |
| 2019/0149633 A1 | 5/2019 | Evans et al. | |
| 2019/0171839 A1 | 6/2019 | Rozenberg et al. | |
| 2020/0159949 A1* | 5/2020 | Burgess | G06F 21/14 |
| 2020/0175209 A1* | 6/2020 | Yost | G06F 21/84 |
| 2020/0265155 A1* | 8/2020 | Dong | G06F 21/6254 |
| 2021/0182429 A1* | 6/2021 | Chen | H04L 51/10 |
| 2023/0169207 A1* | 6/2023 | Gutta | G06Q 20/382 |
| | | | 726/26 |

OTHER PUBLICATIONS

Haley Midgette, OpenSRS' Tiered Access Directory (Gated Whois), Jun. 19, 2018, https://opensrs.com/blog/2018/06/opensrs-tiered-access-directory-gated-whois/, Downloaded on Jun. 29, 2020.

Enom Blog News & Resources, "Tiered Access Data Disclosure Update," Oct. 30, 2019, https://www.enom.com/blog/tiered-access-data-disclosure-update, Downloaded on Jun. 29, 2020.

* cited by examiner

DATA SUBJECT REQUEST TIERING

BACKGROUND

The California Consumer Privacy Act (CCPA) of 2018 includes requirements for companies to provide requestors visibility to their personal information upon request. While a commitment to transparency for customer data and its use is desirable, it is also important to safeguard personal information due to the risks associated with data disclosure, including fraud and information security risks.

There is a need to provide personal information in compliance with the CCPA, while also mitigating risk associated with providing personal data.

SUMMARY

Embodiments of the disclosure are directed to providing personal data to a requester. A data request response provides the requested personal data, while also minimizing security risk.

In a first embodiment, an example method of providing a data disclosure report to a requester includes: receiving a data subject request from a requester, the data subject request including a request for stored personal data; categorizing the element data into one of a plurality of tiers based on a sensitivity level of the element data; assigning a tier to the element data and associated data values; determining a level of detail of the associated data values for each of the element data to provide based on the assigned tier; and providing a data disclosure report to the requester, wherein the data disclosure report includes the level of detail of data values for each of the element data based on the assigned tier.

In another embodiment, an example system for providing a data disclosure report includes: a processor; and a system memory encoding instructions which, when executed by the processor, cause the system to perform the following steps: receive a data subject request from a requester, the data subject request including a request for stored personal data; receive element data and associated data values from at least one source application; categorize the element data into one of a plurality of tiers based on a sensitivity level of the element data and assigning a tier to the element data and associated data value; determine a level of detail of the associated data values for each of the element data to provide based on the assigned tier; and provide a data disclosure report to the requester, wherein the data disclosure report includes the level of detail of data values for each of the element data based on the assigned tier.

In yet another embodiment, an example system for categorizing personal data held by a company includes: a processor, and a system memory encoding instructions which, when executed by the processor, cause the system to perform the following steps: receive a data subject request from a requester, the data subject request including a request for stored personal data; receive a plurality of personal data from at least one source application, wherein at least one aspect of the personal data includes sensitive data; receive a tiering logic including a first tier, second tier, and third tier; assign the tiering logic to the at least one aspect of the personal data; associate the at least one aspect of the personal data with an external definition and a usage; and provide a predetermined level of detail of the personal data based on the tiering logic.

The details of one or more techniques are set forth in the accompanying drawings and the description below. Other features, objects, and advantages of these techniques will be apparent from the description, drawings, and claims.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The systems and methods herein are directed towards obtaining and providing personal and/or confidential data stored by a company to a requester who has requested such data. In accordance with various data privacy laws, companies must provide such personal and/or confidential information to customers and other individuals, including where their data is stored and for what purpose the stored data is used. The systems and methods herein also allow for the mitigation of risks associated with providing personal and/or confidential data, including fraud and information security risks.

In the examples described herein, a company is any company that stores and/or maintains personal and/or confidential data about individuals. Personal and/or confidential data may be data such, but is not limited to, name, address, employment status, pay, benefits, social security number, driver's license number, and other similar information. The individuals may be customers, employees, etc., and are referred to herein as the "requester." Companies may store the data in a variety of applications, and in varying levels of detail. Further, each application may use the data for different purposes. The systems and methods described herein utilize a data subject request portal to retrieve the data from each of the applications.

A tiering approach is intended to maximize the data provided to a requester, in accordance with a request for visibility to the personal and/or confidential data stored by a company. The data provided is the personal and/or confidential data kept by the company, along with a definition, and a reason the company is storing the data. The data subject request model described herein allows companies to provide to the requester specific pieces of personal data the company has collected in a confidential and secure manner. Further, the data subject request model provides data to the requester as transparently as possible while limiting the risks associated with the security and confidentiality of the data.

The tiering approach provides information to a requester in an easy-to-understand output. Having tiered-level responses allow a company to acknowledge where the company has data, provides transparency to its use, and still protects sensitive information when appropriate. For example, a company may acknowledge that it maintains address information of a requester for promotional purposes.

In accordance with the California Consumer Privacy Act (CCPA), a requester (such as a customer, consumer, or employee) has the right to disclosure from a company of the following information: categories of information collected, categories of sources of the information, company or commercial purpose for collecting or selling personal information, categories of personal information disclosed for a company purpose and the categories of third parties with whom the information is shared, categories of personal information sold and the categories of third parties to which the company sold personal information, and if personal information is not being sold. The privacy logical data model is configured to identify and provide this information to a requester as needed and in accordance with the tiered approach described herein.

In accordance with the CCPA, a company that receives a verifiable request relating to the above is obligated (no more than twice in a 12-month period per requester) to make the disclosure free of charge and within 45 days. The disclosure should be made in writing and delivered either through the requester's account with the covered company, by mail, or electronically, at the requester's option if the requester does not have an account with the company.

The tiering approach identifies a plurality of different levels of personal data, such as three different levels of personal data, wherein each level, or tier, represents a different level of detail provided to the requester when a data disclosure report is requested. While three tiers of personal data are described herein, any number of tiers may be implemented. A first tier may include highly confidential data that is not provided to a requester without an additional level of security. For example, if a requester would like to receive all the details associated with data in the first tier, they may have to call a company where they can provide a higher security protocol to receive the highly sensitive data. A second tier may include confidential data with a restricted level of detail. A requester may also need to call a company to receive additional level details with regard to second-tier data. A third tier may include confidential data that is provided with all the associated details.

Tier one is defined as the most sensitive data. Tier one includes data that a company will broadly acknowledge that it holds a category of data, but not specific attributes or values. For example, a response to a requester may state "We have your employee benefits information on file, which we use to manage and support your requested benefits. For your security, we are not providing those details here, but if you have questions about this information, please call . . . " This response provides a category of information, the "employee data," a definition which is "employee benefits information," and why the company is storing this information, "use to manage and support your requested benefits." However, none of the specific attributes or values are provided (the details of the benefits).

Tier two is defined as personal data not readily available to the public. Tier two includes data that a company will provide specific elements and will redact some or all of the specific data values. For example, a response to a requester may state, "We have your Driver's License number and date of birth on file and we use them to support your banking product and services. The Driver's License number we have on file is DLXXXXXX78, and for your protection, we will not display your date of birth." This response provides a category of information, the "customer data," a redacted set of data, "DLXXXXXX78," a definition which is "driver's license number and date of birth," and why the company is storing this information, "support your banking product and services."

Tier one and tier two classification may be appropriate when the category of data is personal data such as protected health information; sensitive financial information (such as information about insolvency, account numbers and details, and national or state identifiers); information about background checks; employee performance reviews, employee compensation, and discipline issues; information that can compromise the security and stability of the company and its system (e.g., user ids, certain modeling results); and data that would enable a bad actor to commit a crime or steal someone's identity.

Tier three data is defined as data that is generally publicly available information. Tier three includes data where the element and associated data or values will be shared. For example, a response to a requester may state, "We have your home address on file as 123 Main St. Charlotte, NC 28202." This response provides a category of information, the "customer data," and the specific attributes or values, "123 Main St. Charlotte, NC 28202."

The authentication mechanism that is utilized to request the personal information will further influence a level of detail (the specific attributes or values) provided by the tiering model. The more sensitive the personal information, the higher level of security needed to be provided by the requester to get the personal information.

A data request response received by a requester may include a combination of personal and/or confidential data identified across all tiers of data. For example, a data disclosure report may acknowledge that the company stores and/or maintains data and provides a level of detail commensurate with the approach tier based on the data itself.

If a requester requests additional insight into their data stored by the company, they may be directed to call a phone number associated with the company. At that point, the requester may be able to receive specific attributes and values associated with tier one or tier two data.

Figure 1:
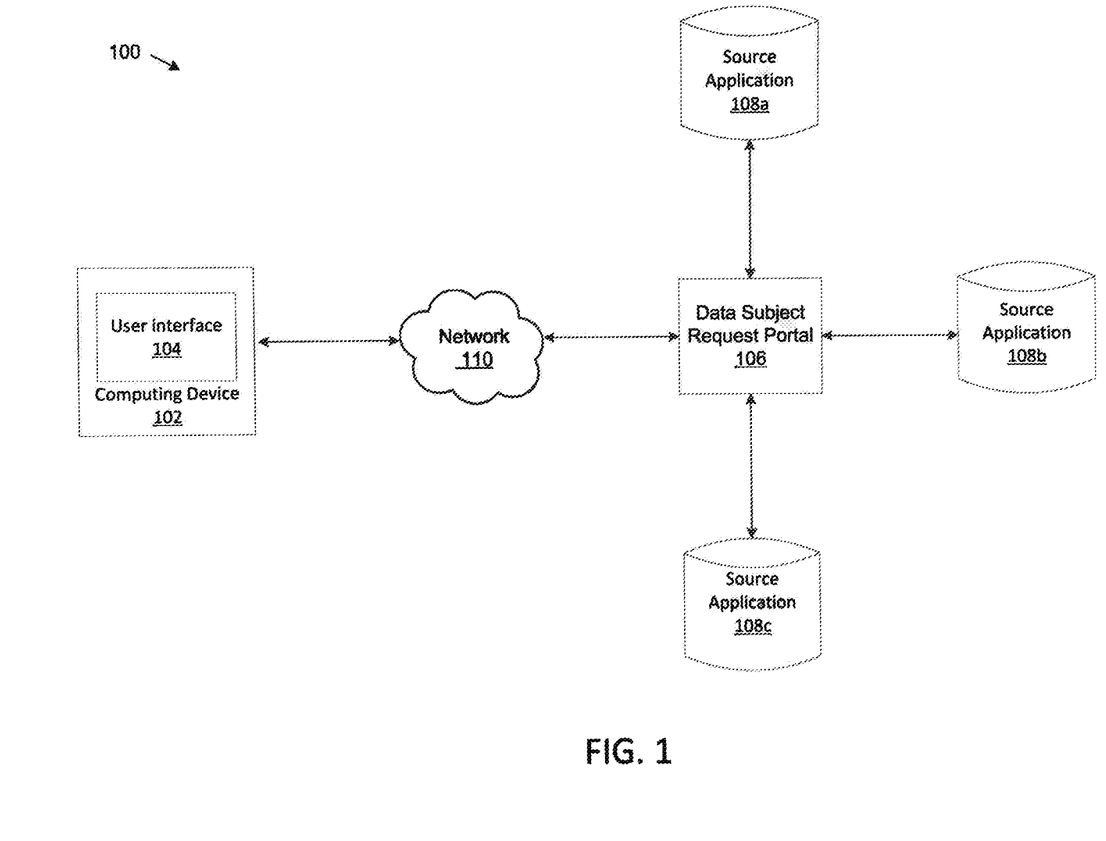
FIG. 1 illustrates a schematic diagram of an example system for implementing data requests.

FIG. 1 illustrates a schematic diagram of an example system 100 for implementing data requests. A data request may be received from a requester at a user interface 104 of a computing device 102. The request is processed by a data subject request portal 106 via a network 110. The data subject request portal 106 communicates with source applications 108a, 108b, 108c, to retrieve the requested data. Once the requested data is received, the data subject request portal 106 can package the data and provide it to the requester, as described in more detail below.

The data subject request portal 106 may be accessed via the computing device 102 directly by the requester. In another embodiment, the data subject request portal 106 may be accessed via the computing device 102 by an employee of the company who is requesting a data disclosure report on behalf of a requester. For example, a requester may call the company to request a data disclosure report, and an employee of the company would request the data disclosure report via the data subject request portion 106 on behalf of the requester.

The example network 110 is a computing device network that may include the Internet, private networks, and a combination thereof. In some arrangements, the network 110 includes wired and/or wireless networks. As noted, in this example, the computing device 102 communicates with the data subject request portal 106 using the network 110.

In the example, the source applications 108a, 108b, 108c are existing applications used within the company. The source applications 108a, 108b, 108c store and/or maintain potential data requested. For instance, the existing source application 108a may be an application used by a marketing department of the company to send promotional material, so the application stores addresses for mailing the promotional material. The reason that the data is stored is required to part of the data disclosure report, so this reasoning (mailing address for providing promotional material) is included in the data disclosure report.

In an embodiment, secure memory encryption processes (SME) are leveraged to identify the source applications within the company that hold the subject data (personal and/or confidential information).

Figure 2:
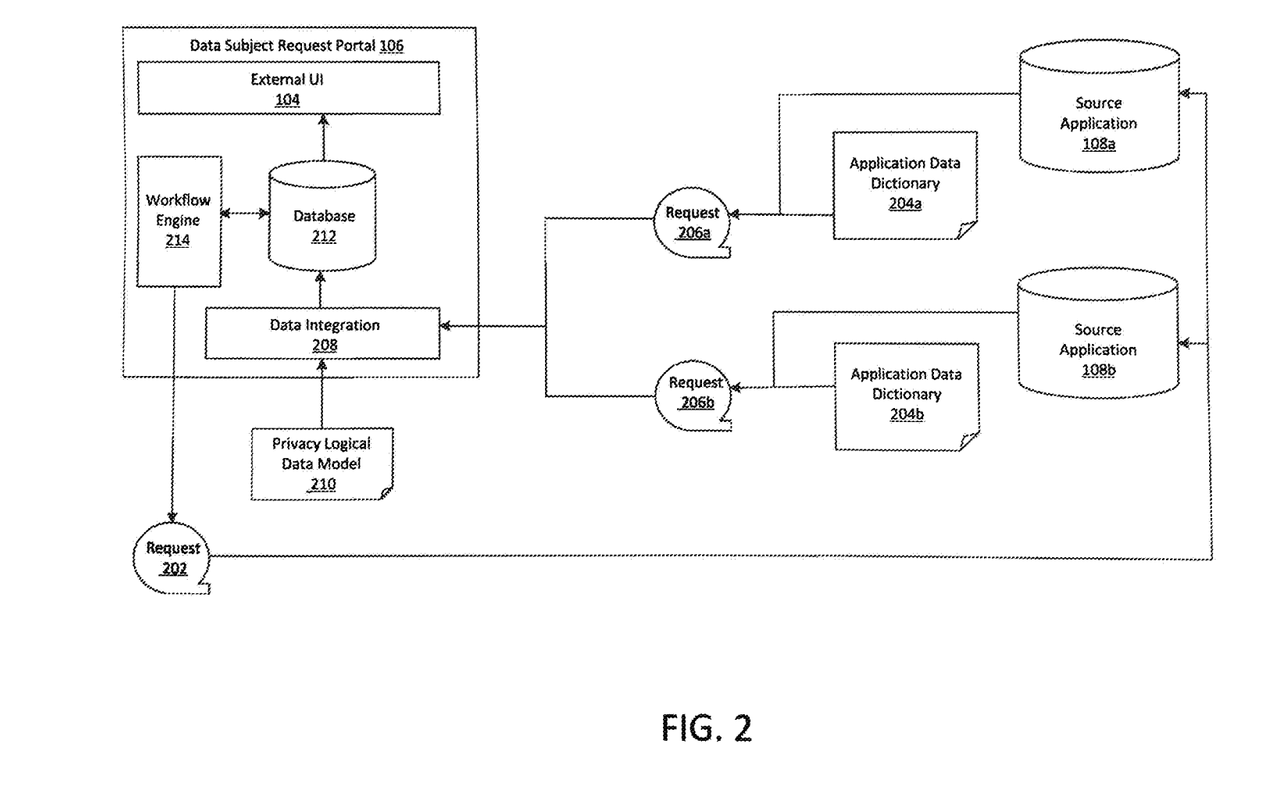
FIG. 2 illustrates an example method used when a data request is received.

FIG. 2 illustrates an example method 200 used when a data request is received. In an example, a requester may log into or otherwise access a data subject request portal 106 maintained by the company. The data subject request portal 106 may have varying levels of authentication steps, where the authentication level is used to determine which tiering approach is provided to the requester. For example, as described above, a standard log-in procedure may avail the requester to a data disclosure report that the company stores and/or maintains personal and/or confidential data and provides a level of detail commensurate with the appropriate tier based on the data itself. In another embodiment, an enhanced log-in procedure (such as calling the company) may allow the requester to receive specific attributes and values associated with tier one or tier two data. The method 200 can be automated, so no individual employee is privy to the data.

The data subject request portal 106 may be an external user interface 104 on a company's website that a requester can access, or may be accessed by an employee of the company when a requester calls a customer service phone number associated with the company.

Once the data subject request portal 106 receives a data request, the request 202 is sent to all internal source applications 108 of a company that may store the requested data. The request 202 includes pertinent information needed by the individual source applications 108 that hold data to determine what information is requested. Pertinent information may include a username or an employee ID. Each source application 108 receives the request 202, and sends the information that the application 108 stores to the request 206a, 206b. Different source applications 108 may store different levels of details of the information, depending on the application's purpose.

At request 206a, 206b, the data received from the source applications 108a, 108b is combined with data definitions received from the application data dictionaries 204a, 204b. Since the data received from each source application 206 may be self-described, the data definitions are used to consolidate the data received when the data is the same, but may be self-described by the source applications 108 differently.

The data dictionary 204 is used to define the specific elements and associated data received from the source applications, and usages of personal data obtained. The data dictionary 204 provides the definitions used to consolidate the data received when the data is the same, but may be self-described by the source applications 108 differently. The data dictionary 204 may also be used to assure that legal requirements are complied with.

While only two source applications 108a, 108b are shown, up to a thousand or more source applications 108 may store data that is subject to a data request.

Once the data from the source applications 108a, 108b and the definitions from the application data dictionaries 204a, 204b are received at the request 206a, 206b, the data, as compiled based on similarity, is sent to a data integration module 208. At the data integration module 208, data is aggregated and the values received are mapped based on the tiering logic received from the privacy logical data model 210, which is described in more detail below.

The data received by the data integration module 208 is stored separately from all other processes within a company at a database 212 within the data subject request portal 106. This is for privacy purposes and to assure that personal data is not intermingled with source applications 108, especially when some source applications 108 are not availed to some of the most sensitive data.

The data, as tiered, is stored in the database 212, which can be used to store the data for a predetermined period of time. In a first example, the data is stored in the database 212 for six months, and the requester is able to view their personal data for those six months. If the requester wants to view their personal data after the six months, a new request needs to be made. When a requester logs into an external user interface 104 to view their personal data, such personal data is pulled from the database 212. The data as provided on the external user interface 104 is redacted as needed based on the tiering level provided by the privacy logical data model 210.

The workflow engine 214 manages the processes occurring when a data request is received. The workflow engine monitors the process flow including receiving a data request, retrieving the data, and providing a data disclosure report.

The privacy logical data model 210 defines the categories of data, including the elements and the associated values to determine an appropriate tiering approach for the data. The privacy logical data model 210 also defines externally facing names and definitions and associates the data with the external definitions. Further, the privacy logical data model 210 defines the tiering approach used, and categorizes and organizes the data based on the tiering approach. The data is categorized and organized based on the tiering approach, and the privacy logical data model 210 may determine what source applications 108 the data will be sourced from. In an embodiment, an additional review process, such as a legal review and consultation, is obtained when the tier applied to the data is a tier one or tier two.

Once the tiering recommendations are accepted, the tiering will be applied at the point of data aggregation. The tiering logic will be applied by data subject request tools on centrally managed tiering assignments. The level of detail provided based on the initial tiering level may be adjusted based on data subject identity confidence, for example, what type of login the customer used.

Figure 3:
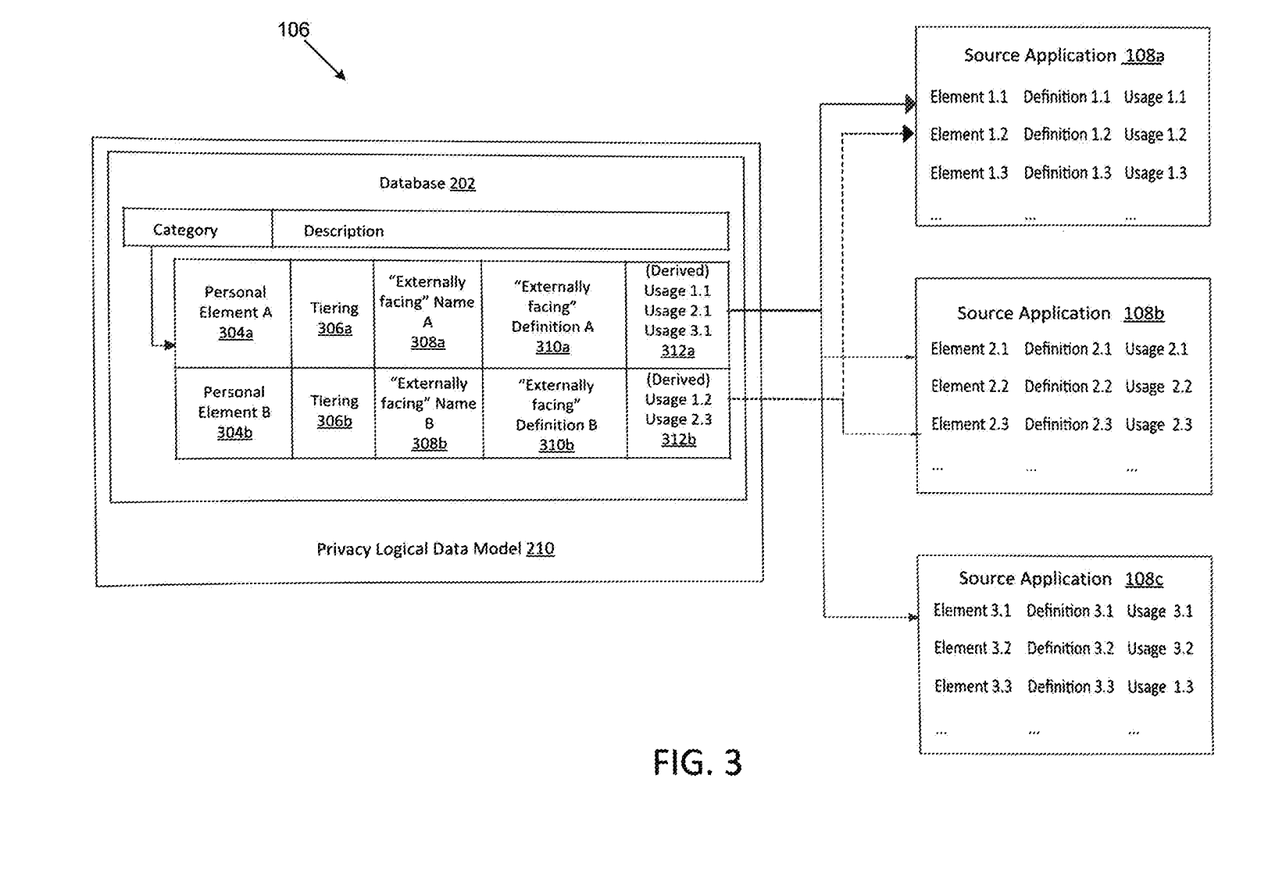
FIG. 3 illustrates an example block diagram of the data subject request portal of FIG. 1.

FIG. 3 illustrates a block diagram of the data subject request portal 106 of FIG. 1. The block diagram illustrates a data mapping schema between the database 212 of the data subject request portal 106 and the source applications 108a, 108b, 108c.

When the data subject request portal 106 receives a data request, the data subject request portal 106 sources the data from any source application 108 that may include the data. In the example provided, the data requested is stored at source applications 108a, 108b, 108c. In conjunction with the privacy logical data model 210, the data is categorized and stored at the database 212.

In the example shown, two categories of data are being sourced: "personal element A" 304a and "personal element B" 304b. Personal element A 304a may be a requester's name and personal element B 304b may be a requester's employment data.

Personal element A 304a can be sourced from a plurality of source applications 108, and the privacy logical data model 210 helps to determine which source applications 108 to source the data from. Possible applications are "Application 1" 108a, "Application 2" 108b, and "Application 3" 108c. Each source application 108 that stores the personal data element includes a mapping to each personal data element of the definition of the personal data element and the usage. The usage includes a reason that the source application 108 stores the personal data element 204. For example, a first source application 108a may store the personal data element for fraud detection purposes.

In the example shown, personal element A 304a is sourced from source application 1 108a, source application 2 108b, and source application 3 108c, with company uses "usage 1.1," "usage 2.1," and "usage 3.1." Personal element B 304b is sourced from source application 1 108a and source application 2 108b, with company uses "usage 1.2" and "usage 2.3." In this example, source application 3 108c does not have any data associated with personal element B.

Once the data is collected, the data is categorized based on the privacy logical data model 210 and stored in database 212. As shown, database 212 is storing personal element A 304a with tiering level 306a. The privacy logical data model 210 provides an externally facing name A 308a and externally facing definition A 310a that is associated with personal element A 304a. The usages 312a associated with personal element A 304a are stored, which include usage 1.1, usage 2.1, and usage 3.1. Personal element B 304b is associated with tiering level 306b, externally facing name B 308b, externally facing definition B 310b, and usages 312b consisting of usage 1.2 and usage 2.3.

For example, personal element A 304a may be the person's name, and personal element B 304b may be employment data. The personal element A 304a may be associated with the externally facing name, "Name" and the associated externally facing definition, "We have your name."

Regarding personal element B 304b, the associated externally facing name is "Employee Data" and the associated externally facing definition is "We have information about your employment at company." Each externally facing name is associated with an externally facing definition.

Figure 4:
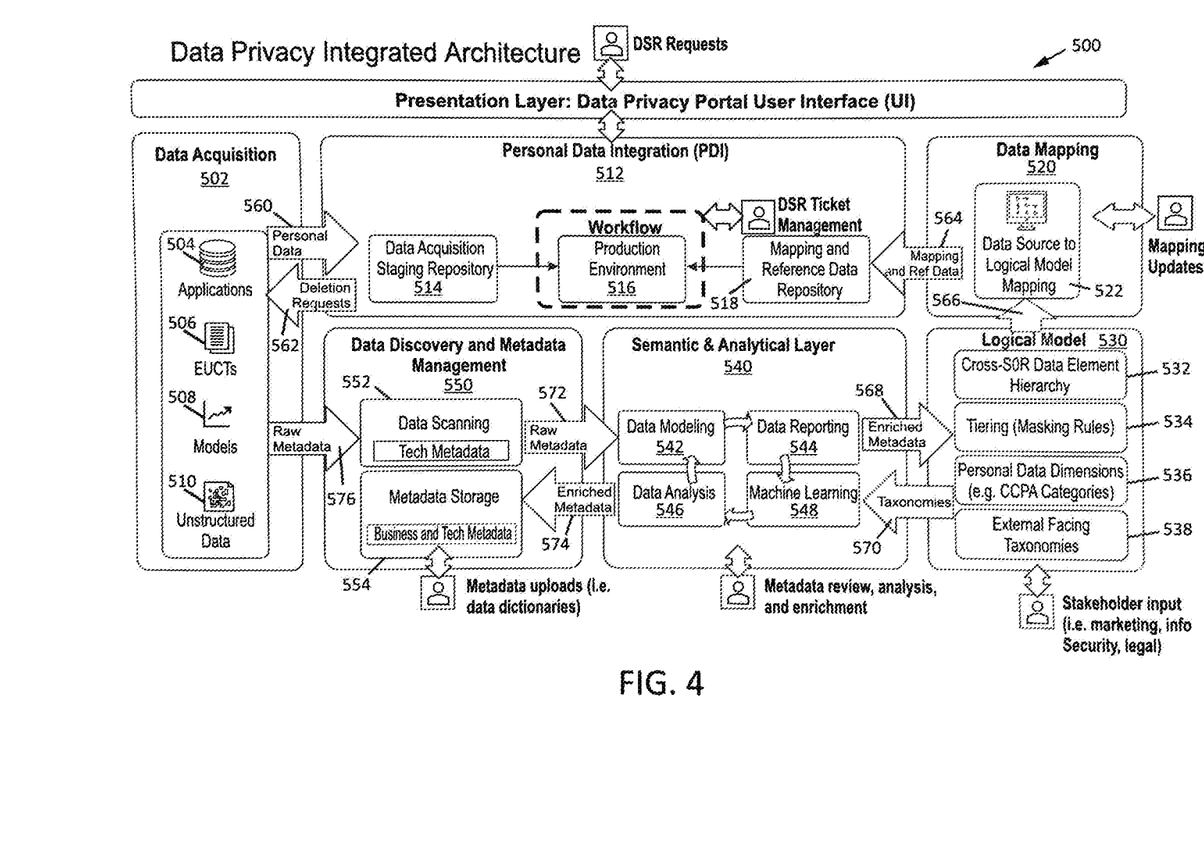
FIG. 4 illustrates a block diagram of a data privacy architecture for processing a data request.

FIG. 4 illustrates an example data privacy architecture 500 for processing a data request. The architecture 500 includes, at least, a data acquisition module 502, a personal data integration module 512, a data discovery and metadata management module 550, a semantic and analytical layer module 540, a data mapping module 520, and a logical model module 530.

The data acquisition module 502 collects and stores personal and/or confidential data across a variety of data assets (such as source applications). The data must be identified and integrated to support a data subject request. The data may be stored in a variety of places, such as applications 504, end-user computing tools (EUCTS) 506, models 508, and as unstructured data 510. Personal and/or confidential data collected from these applications may be sent as an input 560 to the personal data integration module 512, and/or the input 572 including the raw metadata obtained from these applications may be sent to the data discovery and metadata management module 550. Still further, an input 562 including a deletion request may be received from the personal data integration module 512.

The personal data integration module 512 provides a single interface for operations analysis to fulfill data centric requests. Personal and/or confidential data is sourced and mapped to the enterprise data privacy taxonomy in order to automatically populate data subject request response templates. A workflow tool tracks status subject request responses from ingestion through identification verification to fulfillment. The personal data integration module 512 includes a data acquisition staging repository tool 514, a production environment tool 516, and a mapping in reference data repository tool 518. The personal data integration module 512 can also receive mapping in reference data 564 from the data mapping module 520.

The data mapping module 520 automates the ingestion of reference data and mapping files into the personal data integration module 512. The data mapping module 520 includes a data source to logical model mapping tool 522. The data mapping module 520 receives inputs 566 from the logical model module 530. The inputs 566 include a logical model and enriched metadata.

The logical model module 530 manages the organization and display of personal data within a data subject request response. The logical model module 530 includes a data element hierarchy tool 532, a tiering tool 534, a personal data dimensions tool 536, and an external facing taxonomy tool 538. The logical model module 530 receives inputs 568 from the semantic and analytical layer module 540. The inputs 568 include enriched metadata. The logical model module 530 also includes inputs from stakeholders, such as marketing, information security, and legal. The logical model module 530 provides inputs 570, such as taxonomies, to the semantic and analytical layer module 540.

The semantic and analytical layer module 540 includes a data modeling tool 542, a data reporting tool 544, a machine learning tool 548, and a data analysis tool 546. Each of these tools is configured to communicate with each other to provide enriched metadata to send to as an input 568 to the logical model module 530 and as an input 574 to the data discovery and metadata management module 550. The semantic and analytical layer module 540 may also receive inputs, such as metadata reviews, analysis, and enrichment from third party sources.

The data discovery and metadata management module 550 automatically identifies and tracks personal and/or confidential data through a scanning and inventory process. The data discovery and metadata management module 550 includes a data scanning tool 552 and a metadata storage tool 554. Inputs 576 are received, including raw metadata, from the data acquisition module 502, and inputs 574, including enriched metadata, are received from the semantics and analytical layer module 540. Further inputs may be received from third party sources, including metadata, such as data dictionaries.

Once all the pertinent data is received, the personal data integration module 512 sends the data to the data privacy portal user interface 104 for eventual display to the requester.

Figure 5:
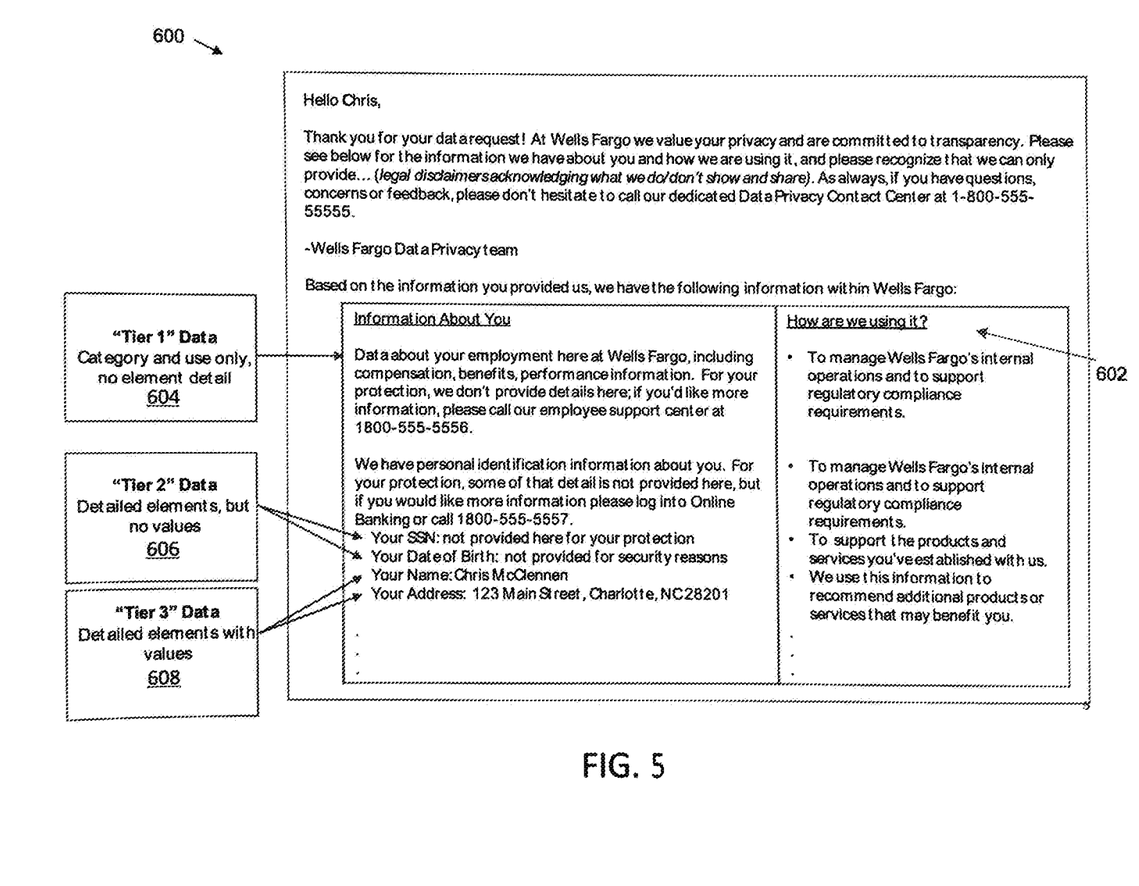
FIG. 5 illustrates an example data disclosure report.

FIG. 5 illustrates an example report 600 sent to a requester after a request for personal and/or confidential data stored by the company is received and processed. The example report 600 includes data about tier one data 604, data about tier two data 606, and data about tier three data 608. As shown, the data related to the tier one data 604 includes data that the data exists, but the details are not provided. Such data requires additional security screening, so the requester is directed to call a number to access the more secure data.

The data related to the tier two data 606 includes what type of data is being stored, but the details of which are not provided. For example, it is noted that the requester's Social Security number and date of birth are being stored, but the exact values of those elements are not provided. Again, if a requester wants more data regarding the tier two data, they are directed to call a number which requires a more secure access strategy.

Tier three data 608 includes the type of data being stored as well as the details. As shown in the example, the requester's name and address is given.

The report 600 also includes a section 602 describing to the requester how the data is being used.

Figure 6:
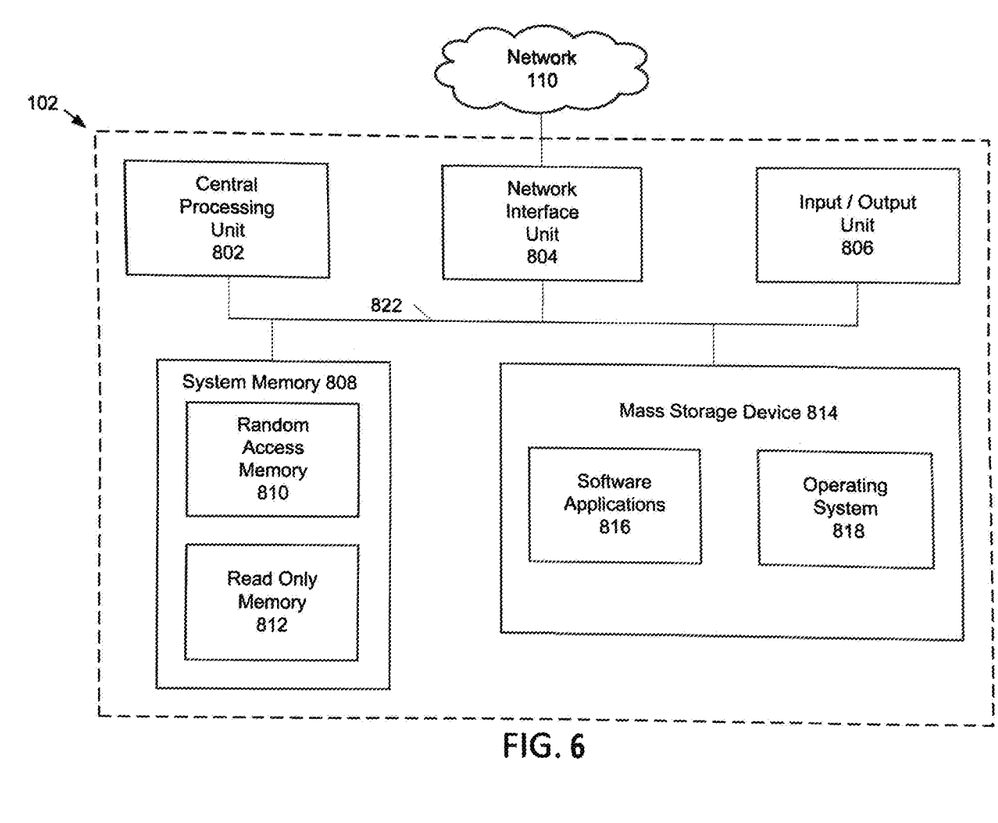
FIG. 6 illustrates example components of a computing device of a requester in the system of FIG. 1.

As illustrated in FIG. 6, example physical components of a computing device 102 are shown.

The computing device 102 includes at least one central processing unit ("CPU") 802, also referred to as a processor, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the computing device 102, such as during startup, is stored in the ROM 812. The computing device 102 further includes a mass storage device 814. The mass storage device 814 is able to store software instructions and data.

The mass storage device 814 is connected to the CPU 802 through a mass storage controller (not shown) connected to the system bus 822. The mass storage device 814 and its associated computing device-readable data storage media provide non-volatile, non-transitory storage for the computing device 102. Although the description of computing device-readable data storage media contained herein refers to a mass storage device, such as a hard disk or solid state disk, it should be appreciated by those skilled in the art that computing device-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, random access memory ("RAM"), read-only memory ("ROM"), erasable programmable read-only memory ("EPROM"), electrically erasable programmable read-only memory ("EEPROM"), flash memory or other solid state memory technology, compact disc read-only memory ("CD-ROMs"), digital versatile discs ("DVDs"), other optical storage media, magnetic cassettes, magnetic tape, magnetic disk storage or other magnetic storage devices, or any other medium which can be used to store the desired information and which can be accessed by the organization server computing device 102.

According to various embodiments, the computing device 102 may operate in a networked environment using logical connections to remote network devices through the network 110, such as the Internet, or another type of network. The computing device 102 may connect to the network 110 through a network interface unit 804 connected to the system bus 822. It should be appreciated that the network interface unit 804 may also be utilized to connect to other types of networks and remote computing systems. The computing device 102 also includes an input/output controller 806 for receiving and processing input from a number of other devices, including a touch user interface display screen, or another type of input device. Similarly, the input/output controller 806 may provide output to a touch user interface display screen or other type of output device.

As mentioned briefly above, the mass storage device 814 and the RAM 810 of the computing device 102 can store software instructions and data. The software instructions include an operating system 818 suitable for controlling the operation of the computing device 102. The mass storage device 814 and/or the RAM 810 also store software instructions and software applications 816, that when executed by the CPU 802, cause the computing device 102 to provide the functionality discussed in this document. For example, the mass storage device 814 and/or the RAM 810 can store software instructions that, when executed by the CPU 802, cause the computing device 102 to route requests between existing application code and new application code.

Embodiments of the present disclosure, for example, are described above with reference to block diagrams and/or operational illustrations of methods, systems, and computer program products. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the disclosure in any way. The embodiments, examples, and details provided in this application are considered sufficient to convey possession and enable others to make and use the disclosed embodiments. The disclosure should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the disclosure and the general inventive concept embodied in this application that do not depart from the broader scope.

What is claimed is:

1. A method of providing a data disclosure report to a requester, the method comprising:
   receiving a data subject request from a requester, the data subject request including a request for stored personal data held by an entity about the requester, the stored personal data being sensitive information about the requester that was previously collected by the entity;

receiving element data and associated data values associated with the personal data from at least one source application of the entity;

categorizing the element data into one of a plurality of tiers based on a sensitivity level of the element data;

assigning an assigned tier to the element data and the associated data values;

determining a level of detail of the associated data values for the element data to provide based on the assigned tier, including providing the elemental data and no specific data values for a first tier, the elemental data and a redacted set of data values for a second tier, and the elemental data and the associated data values for a third tier; and providing a data disclosure report to the requester, wherein the data disclosure report includes the level of detail of the associated data values for the element data based on the assigned tier and usage information, wherein the usage information includes a reason that the at least one source application stores the element data.

2. The method of claim 1, wherein the level of detail of data values provided in the report is dependent on a user authentication protocol.

3. The method of claim 2, wherein the user authentication protocol is a user login on a user interface or a user authenticated phone call.

4. The method of claim 1, wherein the data disclosure report is available to the user for a predetermined period of time.

5. A system for providing a data disclosure report, the system comprising:

a processor; and a system memory encoding instructions which, when executed by the processor, cause the system to:

receive a data subject request from a requester, the data subject request including a request for stored personal data held by an entity about the requester;

receive element data and associated data values associated with the personal data from at least one source application of the entity;

categorize the element data into one of a plurality of tiers based on a sensitivity level of the element data and assigning a tier to the element data and the associated data value;

determine a level of detail of the associated data values for the element data to provide based on the assigned tier, including providing the elemental data and no specific data values for a first tier, the elemental data and a redacted set of data values for a second tier, and the elemental data and the associated data values for a third tier; and provide a data disclosure report to the requester, wherein the data disclosure report includes the level of detail of data values for the element data based on the assigned tier and usage information, wherein the usage information includes a reason that the at least one source applications stores the element data.

6. The system of claim 5, wherein the level of detail of data values provided in the report is dependent on a user authentication protocol.

7. The system of claim 5, wherein the data disclosure report is available to the user for a predetermined period of time.

* * * * *